(12) United States Patent
Faerber

(10) Patent No.: US 9,013,163 B2
(45) Date of Patent: Apr. 21, 2015

(54) BUCK CONVERTER THRESHOLD DETECTION FOR AUTOMATIC PULSE SKIPPING MODE

(75) Inventor: Martin Faerber, Munich (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 1162 days.

(21) Appl. No.: 12/218,420

(22) Filed: Jul. 15, 2008

(65) Prior Publication Data
US 2010/0007318 A1    Jan. 14, 2010

(30) Foreign Application Priority Data

Jul. 9, 2008 (EP) ..................................... 08392008

(51) Int. Cl.
*H02M 3/156* (2006.01)

(52) U.S. Cl.
CPC .................................... *H02M 3/156* (2013.01)

(58) Field of Classification Search
USPC .......................................... 323/282, 284, 285
See application file for complete search history.

(56) References Cited

U.S. PATENT DOCUMENTS

| | | | | |
|---|---|---|---|---|
| 5,229,707 A * | 7/1993 | Szepesi et al. | ................. | 323/222 |
| 5,471,378 A * | 11/1995 | King | ............................ | 363/46 |
| 5,568,044 A * | 10/1996 | Bittner | ......................... | 323/272 |
| 6,014,005 A * | 1/2000 | Loef | ............................ | 318/802 |
| 6,166,528 A | 12/2000 | Rossetti et al. | | |
| 6,195,274 B1 * | 2/2001 | Schroderus et al. | ............ | 363/39 |
| 6,441,597 B1 * | 8/2002 | Lethellier | ...................... | 323/282 |
| 6,462,963 B1 | 10/2002 | Wittenbreder | | |
| 6,479,975 B1 * | 11/2002 | Plankensteiner et al. | ...... | 323/316 |
| 6,914,420 B2 * | 7/2005 | Crocker | ......................... | 323/282 |
| 6,995,483 B2 * | 2/2006 | Kohout et al. | ................ | 307/151 |
| 7,030,596 B1 | 4/2006 | Salerno et al. | | |
| 7,098,632 B2 | 8/2006 | Chen et al. | | |
| 7,109,688 B1 * | 9/2006 | Chiu et al. | ..................... | 323/222 |
| 7,116,089 B1 | 10/2006 | Nguyen et al. | | |
| 7,372,240 B2 * | 5/2008 | Khayat et al. | ................. | 323/283 |
| 7,471,072 B2 * | 12/2008 | Fogg et al. | .................... | 323/284 |
| 7,830,130 B2 * | 11/2010 | Jacques et al. | ................ | 323/282 |
| 2002/0158615 A1 * | 10/2002 | Goodfellow et al. | ......... | 323/315 |

(Continued)

FOREIGN PATENT DOCUMENTS

| | | |
|---|---|---|
| EP | 08392008.2-1242 | 11/2008 |
| WO | WO 96/10287 | 4/1996 |

OTHER PUBLICATIONS

Lacanette, Kerry. A Basic Introduction to Filters—Active, Passive, and Switched-Capacitor. National Semiconductor Application Note 779. Apr. 1991. Retrieved from http://www.swarthmore.edu/NatSci/echeeve1/Ref/DataSheet/IntroToFilters.pdf on Apr. 9, 2014.*

*Primary Examiner* — Fred E Finch, III

(74) *Attorney, Agent, or Firm* — Saile Ackerman LLC; Stephen B. Ackerman

(57) ABSTRACT

Circuits and methods to detect a threshold for entering and leaving a discontinuous current mode of a buck converter have been disclosed. A buck converter is switched to continuous mode if the filtered battery current has reached a defined threshold current $I_{thccm}$. In order to expedite the transition from DCM mode to CCM mode the time delay between two or more pulses of a current through an inductor is monitored and the buck converter is switched to CCM mode if this time delay is smaller than a defined threshold.

17 Claims, 4 Drawing Sheets

(56) References Cited

U.S. PATENT DOCUMENTS

| | | |
|---|---|---|
| 2005/0258808 A1 | 11/2005 | Chen et al. |
| 2006/0022653 A1* | 2/2006 | Reed et al. .................... 323/282 |
| 2006/0119338 A1 | 6/2006 | Soch |
| 2006/0136157 A1* | 6/2006 | Sun et al. ........................ 702/75 |
| 2007/0080671 A1* | 4/2007 | Qahouq et al. ................ 323/282 |
| 2008/0278128 A1* | 11/2008 | Nagase ......................... 323/282 |
| 2009/0231890 A1* | 9/2009 | Schutten et al. ................ 363/44 |

\* cited by examiner

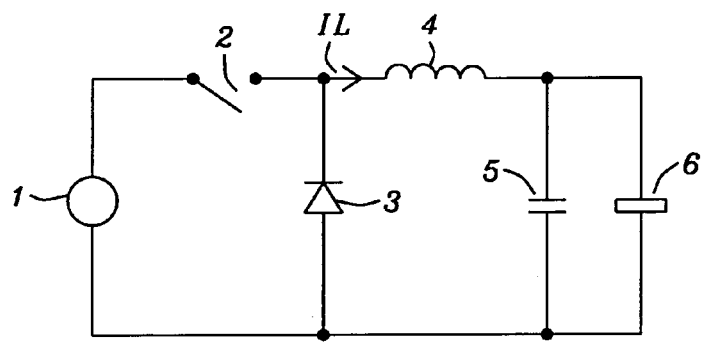
*FIG. 1 - Prior Art*
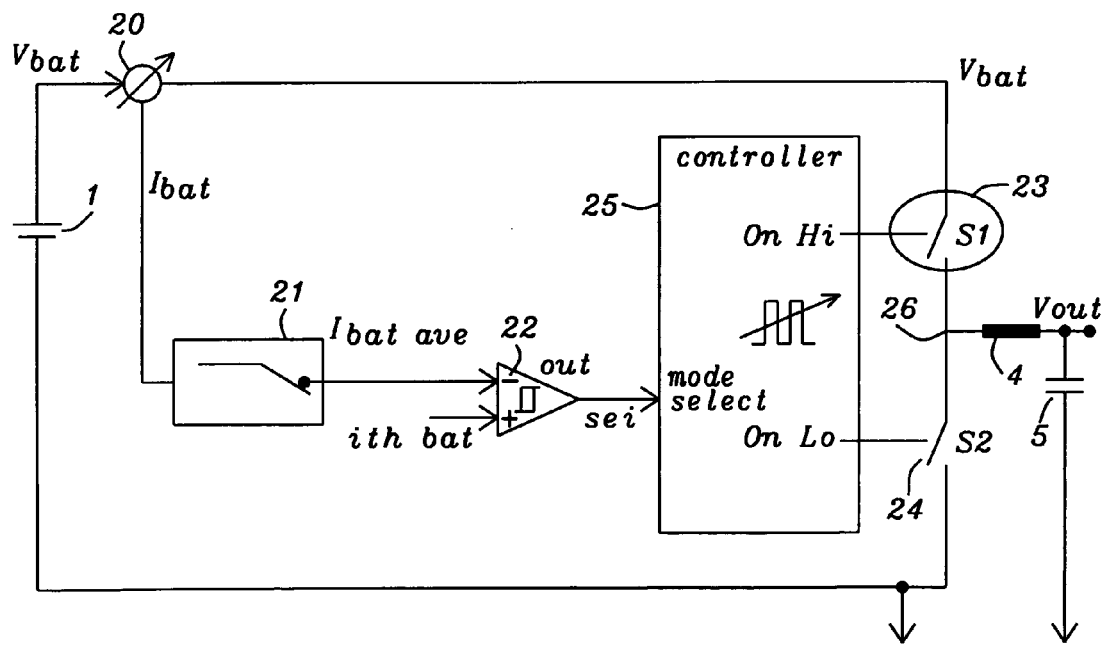
*FIG. 2*

BUCK CONVERTER THRESHOLD DETECTION FOR AUTOMATIC PULSE SKIPPING MODE

BACKGROUND OF THE INVENTION (1) Field of the Invention

This invention relates generally to the field of DC-to-DC converters and relates more specifically to buck converters switching with a high flexibility between continuous current mode and discontinuous current mode.

(2) Description of the Prior Art

A buck converter is a step-down DC to DC converter. It is a switched-mode power supply that uses in its basic implementation two switches (usually a transistor and a diode), an inductor and a capacitor.

FIG. 1 prior art illustrates the basic layout of a buck converter. A buck converter comprises a DC voltage source (usually a battery), a switch 2, a diode 3, an inductor 4, often an output capacitor 5, to keep the output voltage constant, and a load 6. The operation of a buck converter alternates between connecting the inductor 4 via switch 2 to source voltage 1 to store energy in the inductor 4 and discharging the inductor 4 into the load 6.

A buck converter operates in continuous current mode (CCM) if the current $I_L$ through the inductor 4 never falls to zero during the commutation cycle. The energy stored in inductor 4 increases during On-time of switch 2 (switch 2 closed) and then decreases during the Off-state of switch 2 (switch 2 open). The inductor 4 is used to transfer energy from the input to the output of the converter. The energy stored in the capacitor keeps the output voltage more constant.

In some cases, the amount of energy required by the load 6 is small enough to be transferred in a time lower than the whole commutation period. In this case, the current through the inductor 4 falls to zero during part of the period. The only difference to the continuous mode described above is that the inductor 4 is completely discharged at the end of the commutation cycle, therefore the converter operates in a discontinuous current mode (DCM).

As outlined above, the converter operates in discontinuous current mode when low current is drawn by the load 6, and in continuous mode at higher load current levels. The limit between discontinuous and continuous modes is reached when the inductor current falls to zero exactly at the end of the commutation cycle.

Current practice for buck converters with a continuous current mode (CCM, PWM) is to enter a pulse skipping mode or other mode with discontinuous current (DCM, Pulse Frequency Modulation (PFM)), when the output voltage starts to rise. This works only if negative inductor currents are not allowed and the peak current is limited to a minimum value in continuous current mode. Generally a Schottky diode to ground is used to eliminate negative inductor currents.

It is a challenge for the designers of buck converters to detect the optimal threshold for entering and leaving the discontinuous current mode (DCM) and to implement a fast way for switching back to CCM.

There are patents or patent publications dealing the operation of buck converters:

U.S. patent (U.S. Pat. No. 7,098,632 to Chen et al.) discloses a buck converter in a voltage mode having a pair of switches connected in series by a phase node to be switched by a pair of drive signals generated from a first control signal, a phase resistor is connected between a multifunction pin and the phase node, and a controller generates a second control signal and a third control signal from the second drive signal to sense the voltage on the multifunction pin respectively to generate an over-current signal and a CCM mode switch signal to switch the converter between a CCM mode and a DCM mode.

U.S. patent (U.S. Pat. No. 6,166,528 to Rosetti et al.) proposes a buck converter having a synchronous rectifier topology that performs current sensing at the low-side switch and employs "valley current control" to terminate a discharging phase and commence a charging phase of the converter. The buck converter is able to withstand high operating frequencies and low duty cycles to produce a low output voltage from a given high input voltage.

U.S. patent (U.S. Pat. No. 6,462,963 to Wittenbreder) discloses a tapped inductor buck converter which achieves zero voltage switching and continuous input and output terminal currents. To achieve these results an additional switch, a small inductor, and a capacitor are required. The small inductor serves as a source of energy for driving the critical turn on transition of the main switch and the same small inductor also serves as a filter component for smoothing the input and output terminal currents. Simple adaptive gate drive circuits are revealed that improve the timing for turn on of zero voltage switches and reduce gate drive losses. A synchronous rectifier self drive mechanism is revealed which is universally applicable to zero voltage switching power converters with a single main switch which rely on an auxiliary inductor to drive the critical turn on transition of the single main switch. The wave form generated by the auxiliary inductor is ideally suited to synchronous rectifier self drive. Finally, peak current sensing techniques are revealed which are universally applicable to zero voltage switching power converters with a single main switch and an auxiliary switch which rely on an auxiliary inductor to drive the critical turn on transition of the single main switch. The current sensing techniques sense a winding voltage of the auxiliary inductor during the on time of the auxiliary switch. The winding voltage is directly related to the peak current in the main winding of the auxiliary inductor and the peak current in the single main switch of the power converter. The novel current sensing techniques are low noise, reliable, and lossless.

SUMMARY OF THE INVENTION

A principal object of the present invention is to achieve a high flexibility in selecting thresholds for switching between entering and leaving a discontinuous current mode (DCM).

A further object of the present invention is to detect a threshold for entering and leaving a discontinuous current mode (DCM) by measuring the average battery current.

A further object of the present invention is to achieve a threshold detection working independently if negative coil currents are allowed or suppressed and for different current or voltage control modes.

Another object of the present invention is using a same device for battery current measurement in pulse skipping mode as well as for PWM mode.

Another object of the present invention is to achieve an optimum transient behavior by detection of fast rising output currents.

Another object of the present invention is to achieve a fast switching back to CCM by monitoring the delay between two or more current pulses in DCM.

In accordance with the objects of this invention a method to detect a threshold for entering and leaving a discontinuous current mode (DCM) of a buck converter has been disclosed. The method comprises, first, the following steps: (1) providing a buck converter comprising a DC-voltage source—usually a battery, a coil, a means to measure an output current of the voltage source, a filter, a comparator, a controller for DCM/CCM mode controlling a high side switch and a low side switch, (2) checking if the buck converter is in continuous mode and, if positive, go to step 3, else go to step 5, and (3) checking if filtered battery current is lower than defined threshold $I_{thdcm}$ and, if negative, repeat step 3, else go to step 4. The next steps are (4) switch buck converter to DCM mode and go to step 5, (5) checking if filtered battery current has reached defined threshold $I_{thccm}$ and, if negative, repeat step 5, else go to step 6; and (6) switch buck converter to CCM mode and go to step 3.

In accordance with the objects of this invention a buck converter enabled to detect a threshold for entering and leaving a discontinuous current mode of a buck converter has been disclosed. The buck converter comprises, first, DC-voltage source—usually a battery, a means of current measurement monitoring a current provided by said DC-voltage source, and a means of filtering having an input and an output, wherein the input is said current monitored by said means of current measurement and the output is a current being a first input of a current comparing means. Furthermore the buck converter comprises said current comparing means, having inputs and an output, wherein a second input is a reference current, defining a threshold, if said buck converter is to be operated in continuous current mode or in discontinuous current mode and its output is an input to a controller for continuous or discontinuous operating mode depending upon a comparison of its first and second input, said controller for continuous or discontinuous operating mode having two outputs, wherein a first output is controlling a high side switch and a second output is controlling a low side switch, said high side switch wherein a first terminal is connected to an output voltage of said battery and a second terminal is connected to a first terminal of an inductor and to a first terminal of said low side switch. Finally the buck converter comprises said low side switch, wherein a second terminal is connected to ground, said inductor having its second terminal connected to an output port of the buck converter, and a capacitor being connected between said output port and ground.

BRIEF DESCRIPTION OF THE DRAWINGS

In the accompanying drawings forming a material part of this description, there is shown:

FIG. 1 prior art illustrates the basic layout of a buck converter.

FIG. 2 illustrates a block diagram of the threshold detection invented for automatic DCM mode.

DESCRIPTION OF THE PREFERRED EMBODIMENTS

Figure 3:
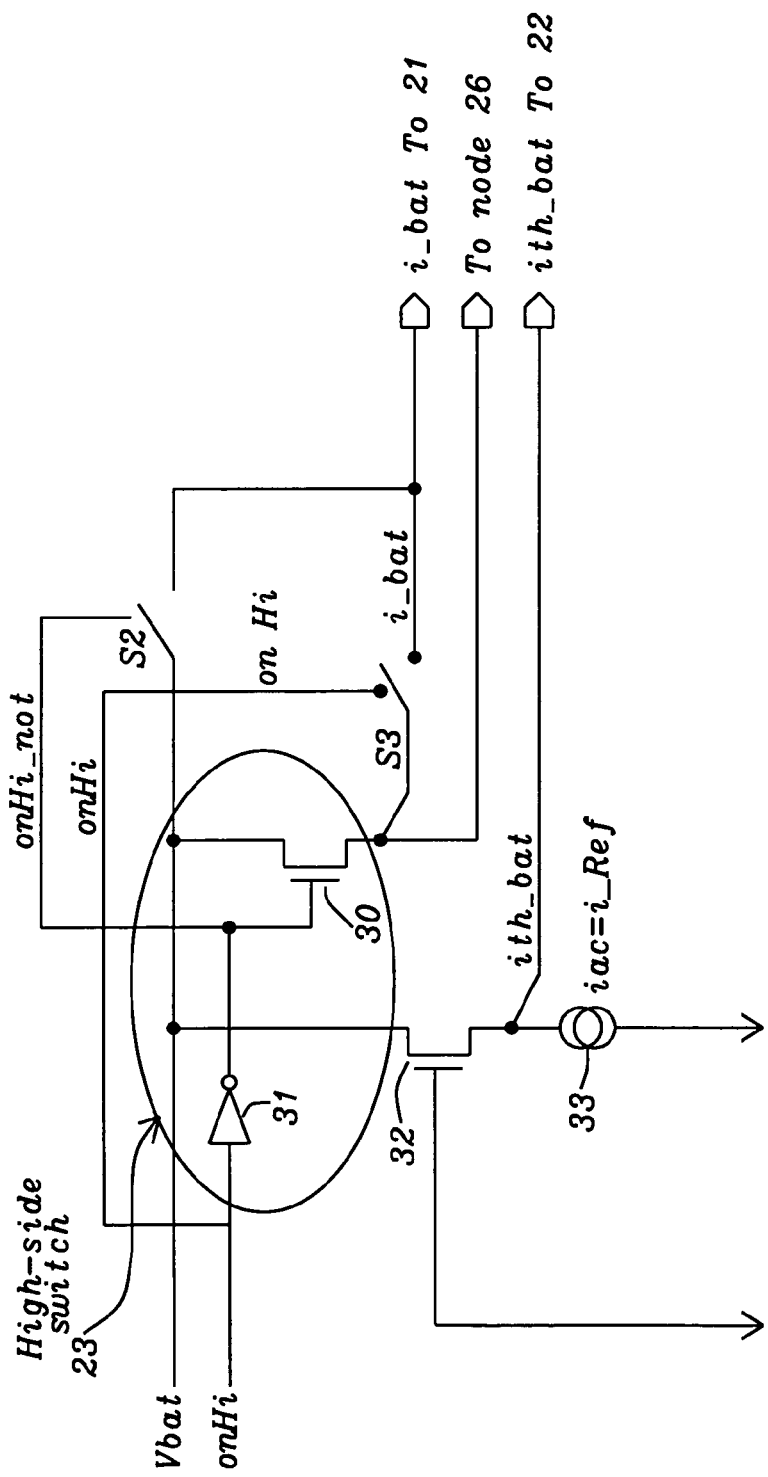
FIG. 3 shows a detailed block diagram of a preferred embodiment of the high side switch and of surrounding circuitry

The preferred embodiments disclose methods and systems to detect a threshold for entering and leaving a discontinuous current mode (DCM) or pulse frequency modulation control mode (PFM) of a buck converter by measuring an average battery current.

FIG. 2 illustrates a block diagram showing the principal building blocks of the threshold detection invented for automatic DCM mode. The block diagram comprises a battery (obviously or any other DC voltage source) 1 providing a battery voltage $V_{bat}$, an inductor 4, usually a coil, and a capacitor 5, being connected between the output voltage $V_{out}$ and ground. Furthermore the block diagram comprises a high side switch 23 and a low side switch 24, wherein both high side and low side switches are controlled by a controller 25. This controller 25 controls these switches for DCM and CCM mode. The selection of DCM or CCM mode is dependent upon the output of a current comparator 22. This comparator 22 compares a reference current $I_{thbat}$ with an average battery current $I_{batave}$.

The battery current $I_{bat}$ is measured by a current measurement means 20, the current $I_{bat}$ is then flowing through a filter 21, the output current $I_{batave}$ of said filter 21, i.e. a filtered $I_{bat}$, is compared by a current comparing means 22 with a reference current $I_{thbat}$.

The output sel of said current comparing means 22, depending upon the result of the comparison of current $I_{batave}$ with current $I_{thbat}$, is an input to the DCM/CCM controller 25. This output sel can initiate, depending upon the result of the comparison, the controller 25 to switch from CCM to DCM or vice versa. The controller 25 has two outputs. A first output onHi controls the high side switch 23, the second out onLo controls the low side switch 24.

The high side switch 23 is connected between voltage $V_{bat}$ and node 26, which is connected to a first terminal of inductor 4, the low side switch 24 is connected between node 26 and ground.

In case the buck converter is in CCM or synchronous mode the buck converter is switched to DCM or PFM mode if current $I_{batave}$ is lower than an $I_{thdcm}$ value of current $I_{thbat}$.

In case the buck converter is in DCM mode, the buck converter is switched to CCM or synchronous mode if current $I_{batave}$ is higher than a current level of current $I_{thccm}$. It should be noted that the current threshold level of $I_{thccm}$ is higher than the current level of $I_{thdcm}$.

The filter 21 is a low pass filter with a cut-off frequency below the switching frequency of the buck converter. The preferred type of this filter is a second or higher order filter.

The comparator 22 needs to have a low offset to have a precise switching threshold but the switching speed can be moderate, as the input signal comes from a low pass filter. If a current to voltage conversion is done by the measurement means or by the filter the comparator is a voltage comparator.

Figure 5:
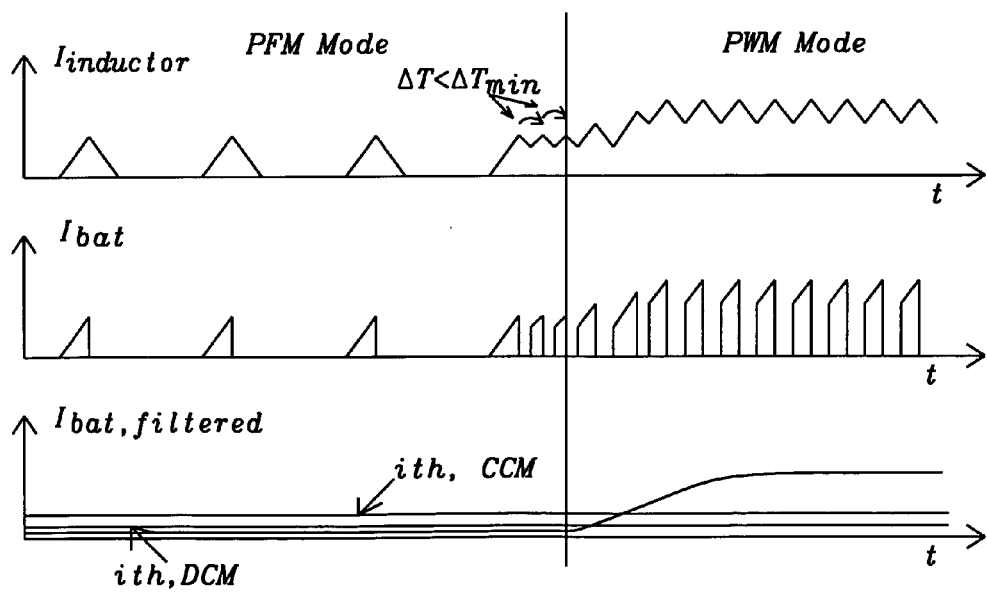
FIG. 5 illustrates simplified waveforms for a fast transition from PFM to PWM mode.

Additionally, in order to expedite the transition from DCM to CCM mode, the delay between the pulses in DCM mode can be monitored and the buck converter is switched back to CCM mode if the delay between two or more pulses is below a defined limit. This defined limit is reached if the delay $\Delta T_{min}$, shown in FIG. 5, is close to the switching period $1/f_{ccm}$ in CCM mode.

The delay $\Delta T_{min}$ can be measured for example by comparing it with a simple RC-delay or if a clock signal is available a counter can compare the delay to a fixed number of clock cycles.

In order to avoid toggling of the buck converter the design parameters $I_{thdcm}$ and $\Delta T_{min}$ have to be chosen carefully: The delay $\Delta T_{min}$ has to be chosen in a way, that the buck converter can provide a higher (DC-) output current than the output current at the threshold $I_{thdcm}$ in DCM mode before two or more pulses follow each other with $\Delta T_{min}$. Else toggling would happen even with a constant load current.

Alternatively the OFF-time of the high side switch can be monitored in order to switch back to CCM mode in case the OFF-time is below a defined limit. The output current at this switching point has to be again above the threshold current $I_{thdcm}$, otherwise the buck converter would immediately switch back to DCM and the converter would toggle between the two modes.

FIG. 3 shows a detailed block diagram of a preferred embodiment of the high side switch 23 and of surrounding circuitry. It should be understood that this is an example of an implementation. Other kinds of implementations are also possible.

The high side switch 23 comprises a PMOS transistor 30, wherein its source is connected to battery voltage $V_{bat}$, the drain is connected to node 26 shown in FIG. 2 (i.e. to inductor 4) and its gate is connected via inverter 31 to the first output onHi of the DCM/CCM controller 25. Alternatively an NMOS or a bipolar transistor could be used as well for the high side switch.

A preferred embodiment of a means of measurement the battery current is shown in FIG. 3. Other implementations of the measurement of the battery current are possible as well. The measurement of the battery current is performed by a comparison of the voltage drop across the high side switch transistor 30 and of the voltage drop across a reference transistor 32. This reference transistor 32 has matching properties in reference to transistor 30. Therefore both transistors 30 and 32 need to be of the same type (pnp, npn, p-MOS, etc.)

The battery current is measured by comparing the voltage drop across transistor 30 with the voltage drop across transistor 32. PMOS transistors 30, 32 match in properties as outlined above having a multiplier factor m in regard of the resistance ratio of both transistors. Both sources are connected to the $V_{bat}$ node, both gates are connected to GND (or the same gate-voltage). So the voltage at node 26 is $V_{net26} = V_{bat} - (I\_Ref * R_{device32})$ and the average voltage at $V_{ith\_bat}$ is $V_{ith\_bat} = I_{bat,avg} * R_{device32}/m = d * I_{bat,pMOS on} * R_{device32}/m$, wherein d is the duty cycle of the buck converter, during which the gate of PMOS 30 is switched to GND by the inverter 31. The gates of transistor 30 in ON state and of transistor 32 need to have the same potential. This is achieved by having GND as negative supply for the inverter 31.

The output of high side switch 30 is connected via switch S3 to the input of the filter 21, shown in FIG. 2, as long as the high side switch 30 is ON.

In case the high side switch is off, the input of the filter 21 is connected to the supply voltage Vbat by switch S2. A constant current source 33 is providing a constant reference current used for the comparison with the output current $I_{batave}$ of filter 21. This comparison is performed by comparator 22, shown in FIG. 2.

There are different alternatives possible to achieve different levels of current $I_{thbat}$, namely $I_{thdcm}$ and $I_{thccm}$. A simple solution is to use a comparator with a hysteresis. The disadvantage of this solution is that the difference between both currents then depends on $R_{device32}$. In a preferred embodiment the reference current is switched between 2 levels ($I_{ref\_ccm}$ and $I_{ref\_dcm}$) depending on the value of sel.

Figure 4:
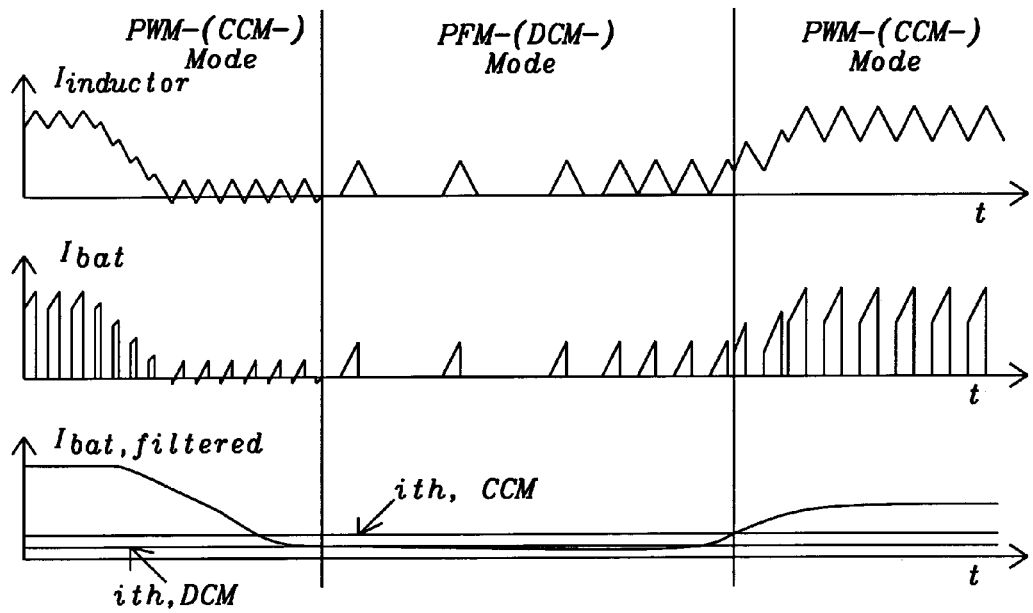
FIG. 4 illustrates simplified waveforms for the transition between CCM and DCM modes.

FIG. 4 illustrates simplified waveforms for the transition between CCM and DCM modes. The first time section shows the currents through the inductor $I_{inductor}$, the battery current $I_{bat}$, and the filtered battery current $I_{batave}$ as output of filter 21 in PWM/CCM mode. The second time section shows these three currents in PFM/DCM mode, and the third time section shows these currents in PWM/CCM mode again. Furthermore the filtered battery current $I_{batave}$ is shown versus both threshold reference currents $I_{thccm}$ and $I_{thdcm}$. The transition from PWM/CCM to PFM/DCM is performed (at the end of time section 1) when the filtered battery current $I_{batave}$ is lower than the threshold current $I_{thdcm}$. The transition from PFM/DCM to PWM/CCM is performed (at the end of time section 2) when the filtered battery current $I_{batave}$ has reached the threshold current $I_{thccm}$.

FIG. 5 illustrates simplified waveforms for an expedited transition from PFM to PWM mode. The first time section shows the currents through the inductor $I_{inductor}$, the battery current $I_{bat}$, and the filtered battery current $I_{batave}$ as output of filter 21 in PFM mode. The second time section shows these three currents in PWM mode. Furthermore the filtered battery current $I_{batave}$ is shown versus both threshold reference currents $I_{thccm}$ and $I_{thdcm}$. Towards the end of section 1 the delay $\Delta T$ between pulses of the currents through the inductor $I_{inductor}$ is smaller than a defined $\Delta T_{min}$. In this case, if also the filtered battery current $I_{batave}$ is lower than the threshold current $I_{thdcm}$, the transition to PWM mode is performed in a expedited way.

Figure 6:
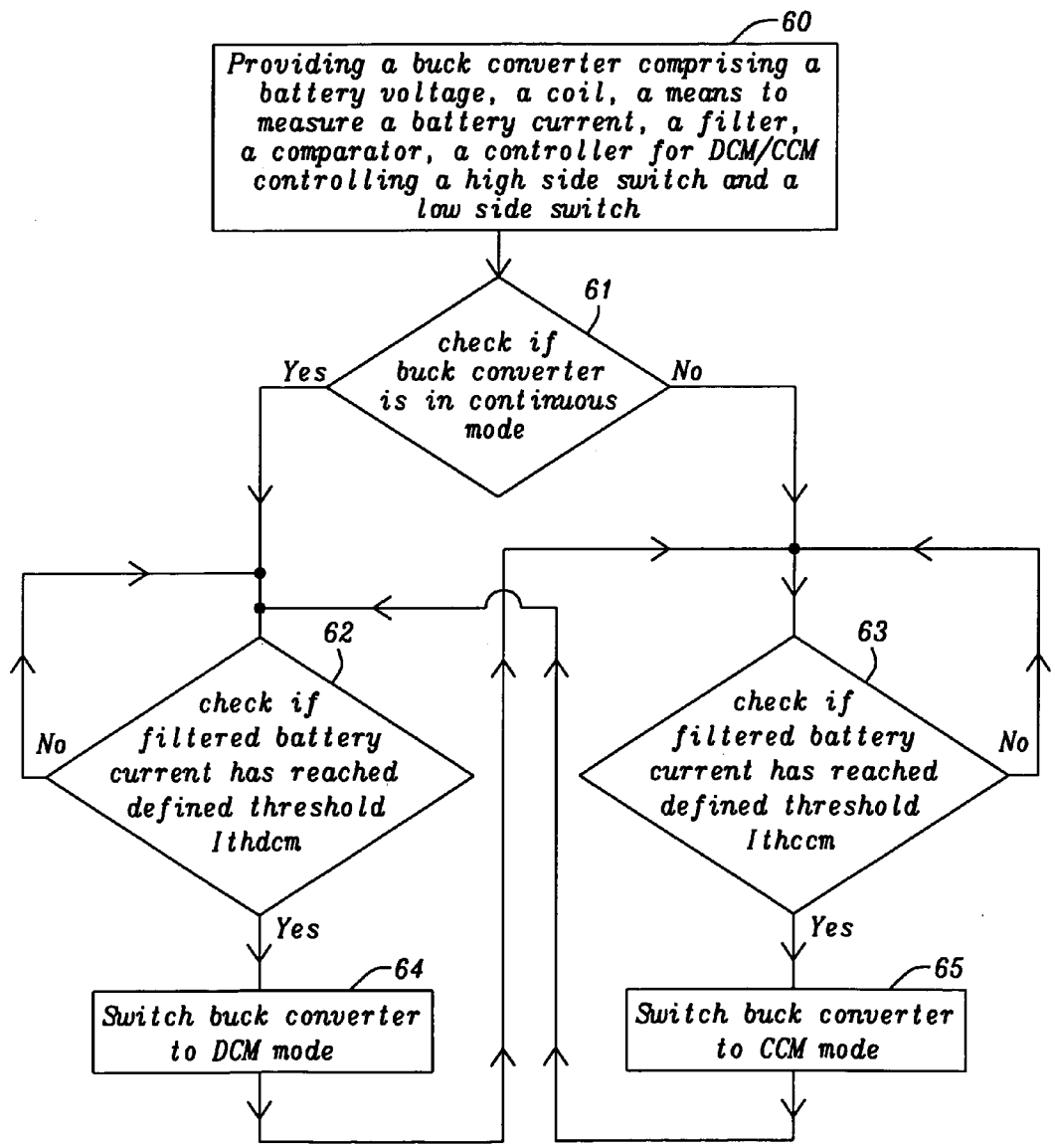
FIG. 6 illustrates a flowchart of a method invented to detect a threshold for entering and leaving a discontinuous current mode (DCM) or pulse frequency modulation control mode (PFM) of a buck converter.

FIG. 6 illustrates a flowchart of a method invented to detect a threshold for entering and leaving a discontinuous current mode (DCM) or pulse frequency modulation control mode (PFC) of a buck converter. A first step 60 describes the provision of a buck converter comprising a battery voltage, a coil, a means to measure a battery current, a filter, a comparator, and a controller for DCM/CCM mode controlling a high side switch and a low side switch. The following step 61 is a check if the buck converter is in CCM or synchronous mode and, if positive, the process flow goes to step 62, otherwise the process flow goes to step 63. Step 62 illustrates a check if filtered battery current is lower than the defined threshold current $I_{thdcm}$ and, if negative, the process flow goes back to step 62 again. In case the check of step 62 is positive the buck converter is switched in step 64 to DCM or PFM mode and the process flow continues with step 63.

Step 63 illustrates a check if filtered battery current has reached the defined threshold current $I_{thccm}$ and, if negative, the process flow goes back to step 63 again. In case the check of step 63 is positive, the buck converter is switched in step 65 to CCM or PWM mode and the process flow continues with step 62.

Additionally, if the buck converter is in DCM or PFC mode, the delay time between the pulses of the current through said inductor can be monitored and the buck converter can be switched to CCM or PWM mode if the delay time between the pulses is smaller than a defined threshold.

Alternatively, instead of monitoring the delay time between the pulses of the current through said inductor, the off-time of the high side switch can be monitored and compared with the defined threshold.

While the invention has been particularly shown and described with reference to the preferred embodiment thereof, it will be understood by those skilled in the art that various changes in form and details may be made without departing from the spirit and scope of the invention.

What is claimed is:

1. A method to detect a threshold for entering and leaving a Continuous Current Modulation (CCM) mode of a buck converter comprising the following steps:
   (1) providing a buck converter comprising a DC voltage source, a coil, a means to measure continuously an output current of said voltage source, a filter, a comparator, a controller for CCM/DCM mode controlling a high side switch and a low side switch;

(2) measuring continuously total output current of the DC voltage source, which is also a total input current of the buck converter;

(3) filtering the total input current measurement and comparing subsequently the filtered measurement to a threshold, wherein the filtering is performed by a low-pass filter with a cut-off frequency below the switching frequency of the buck converter;

(4) checking if the buck converter is in continuous current mode and, if true, go to step 5, else go to step 7;

(5) checking if the filtered total output current measurement of the DC voltage source is lower than a threshold $I_{thdcm}$ and, if false, repeat step 5, else go to step 6;

(6) switch buck converter to DCM mode and go to step 7;

(7) checking if the filtered total output current measurement of the DC voltage source has reached a threshold $I_{thccm}$ and, if false, repeat step 7, else go to step 8; and (8) switch buck converter to CCM mode and go to step 5.

2. The method of claim 1 wherein the low-pass filter has a higher order than a first order filter.

3. A buck converter capable of detecting a threshold for entering and leaving a Continuous Current Modulation (CCM) mode of a buck converter comprising:
   a port of a DC voltage source;
   a means of current measurement capable of measuring total output current of the DC voltage source, wherein the total output current of the DC voltage source is providing total input current of the buck converter;
   a low-pass filter having an input and an output, wherein the input is said input current measured by said means of current measurement and the output is a current being a first input of a current comparing means and, wherein the low-pass filter has a cut-off frequency below the switching frequency of the buck converter;
   said current comparing means, having inputs and an output, wherein a second input is a reference current, defining a threshold, if said buck converter is to be operated in Continuous Current Mode (CCM) or in Discontinuous Current Mode (DCM) and its output is an input to a controller for CCM or DCM operating mode depending upon a comparison of its first and second input;
   said controller for DCM or CCM operating mode having two outputs, wherein a first output is controlling a high side switch and a second output is controlling a low side switch;
   said high side switch wherein a first terminal is connected to an output voltage of a battery and a second terminal is connected to a first terminal of an inductor and to a first terminal of said low side switch;
   said low side switch, wherein a second terminal is connected to ground;
   said inductor having its second terminal connected to an output port of the buck converter; and
   a capacitor being connected between said output port and ground.

4. The buck converter of claim 3 wherein said high side switch is a transistor.

5. The buck converter of claim 4 wherein said total input current provided by said DC voltage source is measured by a comparison of a voltage drop across said high side switch transistor and the voltage drop across a reference transistor.

6. The buck converter of claim 4 wherein said high side switch comprises:
   a PMOS transistor, wherein its source is connected to said DC voltage source, its drain is connected to said first terminal of said inductor, and its gate is connected to an output port of an inverter; and
   said inverter having its input connected to said first output of said controller.

7. The buck converter of claim 4 wherein said means of current measurement is performed by a comparison of a voltage drop across the high side switch transistor and of a voltage drop across a reference transistor, wherein the reference transistor is of the same type and has matching properties compared to the transistor of the high side switch and wherein the source of the reference transistor is connected to said DC voltage source, its drain is connected via a current source to ground and its gate is connected to ground.

8. The buck converter of claim 4 wherein said high side switch comprises an NMOS transistor.

9. The buck converter of claim 4 wherein said high side switch comprises a bipolar transistor.

10. The buck converter of claim 3 wherein said low side switch is a transistor.

11. The buck converter of claim 3 wherein the low-pass filter has a higher order than a first order filter.

12. A method to detect a threshold for entering and leaving a Continuous Current mode (CCM) of a buck converter comprising the following steps:
   (1) providing a buck converter comprising a DC voltage source, a coil, a means to measure an output current of said voltage source, a filter, a comparator, a controller for PFM/PWM mode controlling a high side switch and a low side switch;
   (2) measuring continuously total output current of the DC voltage source, which is also a total input current of the buck converter;
   (3) filtering of the total input current measurement and subsequent comparison of the filtered measurement to a threshold, wherein the filtering is performed by a low-pass filter with a cut-off frequency below the switching frequency of the buck converter;
   (4) checking if the buck converter is in CCM mode and, if true, go to step 5, else go to step 7;
   (5) checking if filtered total output current measurement of the DC voltage source is lower than a threshold $I_{thdcm}$ and, if false, repeat step 5, else go to step 6;
   (6) switch buck converter to DCM mode and go to step 7;
   (7) checking if a delay time between two or more pulses is smaller than a defined threshold $\Delta Tmin$ and, if false, repeat step 7, else go to step 8; and
   (8) switch buck converter to CCM mode and go to step 5.

13. The method of claim 12 wherein said threshold $\Delta Tmin$ is reached if the delay time between pulses of said high side switch is close to a switching period of the buck converter in PWM mode.

14. The method of claim 12 wherein said delay time between pulses of the high side switch is measured by a comparison using an RC-delay circuit.

15. The method of claim 12 wherein said defined threshold $\Delta Tmin$ is defined in such a way, that the buck converter can provide a higher output current in PFM mode before two or more pulses follow each other with $\Delta T_{min}$ than the output current at the threshold $I_{thdcm}$.

16. The method of claim 12 wherein the low-pass filter has a higher order than a first order filter.

17. A method to detect a threshold for entering and leaving a Continuous Current Modulation mode (CCM) of a buck converter comprising the following steps:
   (1) providing a buck converter comprising a DC voltage source, a coil, a means to measure an output current of said voltage source, a filter, a comparator, a controller for DCM/CCM mode controlling a high side switch and a low side switch;

(2) measuring continuously total output current of the DC voltage source, which is also a total input current of the buck converter;
(3) filtering total input current measurement and subsequent comparison of the filtered measurement to a threshold, wherein the filtering is performed by a low-pass filter with a cut-off frequency below the switching frequency of the buck converter and wherein the low-pass filter has a higher order than a first order filter;
(4) checking if the buck converter is in CCM mode and, if true, go to step 5, else go to step 7;
(5) checking if filtered total output current measurement of the DC voltage source is lower than a threshold $I_{thdcm}$ and, if false, repeat step 5, else go to step 6;
(6) switch buck converter to DCM mode and go to step 7;
(7) checking if an OFF-time of said high side switch is smaller than a defined threshold and, if false, repeat step 7, else go to step 8; and
(8) switch buck converter to CCM mode and go to step 5.

* * * * *